United States Patent
Bar Shalom

(10) Patent No.: US 12,032,054 B2
(45) Date of Patent: Jul. 9, 2024

(54) MULTI-STAGE ANGLE OF ARRIVAL ESTIMATE IN VEHICLE RADAR SYSTEM

(71) Applicant: GM Global Technology Operations LLC, Detroit, MI (US)

(72) Inventor: Ofer Bar Shalom, Kiryat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 317 days.

(21) Appl. No.: 17/480,814

(22) Filed: Sep. 21, 2021

(65) Prior Publication Data

US 2023/0086891 A1 Mar. 23, 2023

(51) Int. Cl.
*G01S 13/68* (2006.01)
*G01S 13/931* (2020.01)
*G01S 13/02* (2006.01)

(52) U.S. Cl.
CPC ............ *G01S 13/68* (2013.01); *G01S 13/931* (2013.01); *G01S 2013/0245* (2013.01)

(58) Field of Classification Search
CPC . G01S 13/68; G01S 2013/0245; G01S 13/931
See application file for complete search history.

(56) References Cited

U.S. PATENT DOCUMENTS

| | | | | |
|---|---|---|---|---|
| 11,644,565 B2 * | 5/2023 | Li | ........................ | G01S 13/872 342/43 |
| 11,736,209 B1 * | 8/2023 | Bar Shalom | ........... | H04B 17/12 455/63.4 |
| 2011/0140952 A1 * | 6/2011 | Kemkemian | ......... | G01S 13/426 342/146 |
| 2018/0038950 A1 * | 2/2018 | Cornic | .................... | G01S 13/46 |
| 2021/0255301 A1 * | 8/2021 | Campbell | ............. | G01S 13/284 |
| 2022/0268883 A1 * | 8/2022 | Wu | ......................... | G01S 7/356 |

OTHER PUBLICATIONS

Barabell, Arthur J., "Improving the Resolution Performance of Eigenstructure-Based Direction-Finding Algorithms", ICASSP 83, 1983, pp. 336-339.

(Continued)

*Primary Examiner* — Marcus E Windrich
(74) *Attorney, Agent, or Firm* — CANTOR COLBURN LLP

(57) ABSTRACT

A system in a vehicle includes a radar system with a uniform linear array (ULA) of antenna elements and a uniform rectangular array (URA) of antenna elements to receive the reflected signals resulting from the emitted radio frequency energy. The ULA is arranged perpendicular to the URA. Processing circuitry estimates one or more elevation angles using the reflected signals received by the ULA of antenna elements and estimates an azimuth angle corresponding to each of the one or more elevation angles using the one or more elevation angles and the reflected signals received by the URA of antenna elements. Each of the one or more elevation angles and the corresponding one of the azimuth angles is referred to as an angle of arrival (AOA) of the reflected signals from an object. Control of an operation of the vehicle is based on each AOA of each object.

22 Claims, 3 Drawing Sheets

(56) References Cited

OTHER PUBLICATIONS

Chen et al., "ESPRIT-Like Two-Dimensional DOA Estimation for Coherent Signals", IEEE Transactions on Aerospace and Electronic Systems, vol. 46, No. 3, Jul. 2010, pp. 1477-1484.
Krim et al., "Two Decades of Array Signal Processing Research", IEEE Signal Processing Magazine, Jul. 1996, pp. 67-94.
Roy et al., "ESPRIT-Estimation of Signal Parameters via Rotational Invariance Techniquest", IEEE Transactions on Acoustics, Speech, and Signal Processing, vol. 37, No. 7, Jul. 1989, pp. 984-995.

* cited by examiner

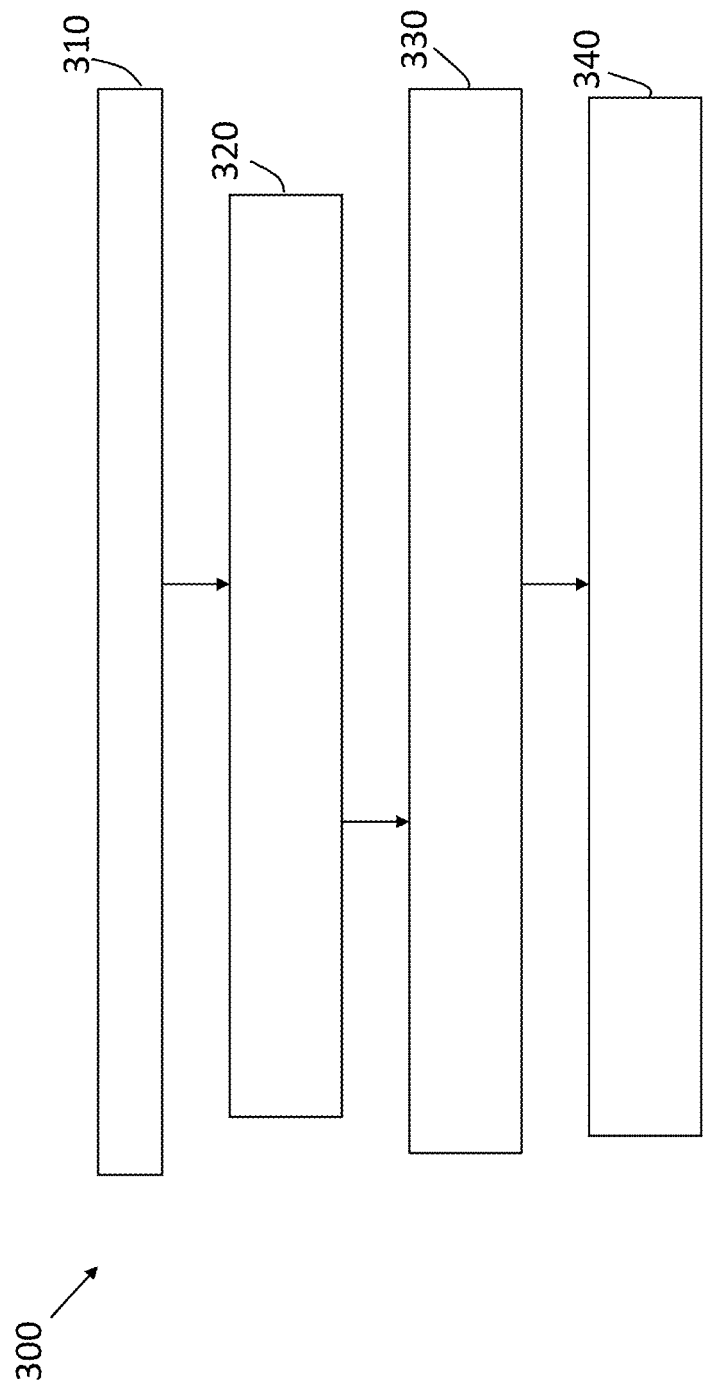

MULTI-STAGE ANGLE OF ARRIVAL ESTIMATE IN VEHICLE RADAR SYSTEM

INTRODUCTION

The subject disclosure relates to a multi-stage angle-of-arrival (AOA) estimate in a vehicle radar system.

Vehicles (e.g., automobiles, trucks, construction equipment, farm equipment, automated factory equipment) increasingly use sensors to obtain information about the vehicle and its surrounding. Exemplary sensors that obtain information about the vehicle include an inertial measurement unit (IMU) and a steering wheel angle sensor. Exemplary sensors that obtain information about the area around the vehicle include cameras, radar systems, and lidar systems. The information may facilitate semi-autonomous operation (e.g., adaptive cruise control, automatic braking), autonomous operation, or warnings to the driver. Different sensors provide different information.

A radar system includes transmit elements that emit energy at radio frequencies. When the transmitted signals encounter an object, some of the energy is reflected back. A radar system provides range and AOA to each detected object and may additionally provide range rate (i.e., relative velocity or Doppler) to each object. The AOA refers to the angle from which a reflected signal is received at each antenna (relative to the antenna boresight). When reflections are highly correlated, AOA estimation may be challenging. Accordingly, it is desirable to provide a multi-stage AOA estimate in a vehicle radar system.

SUMMARY

In one exemplary embodiment, a system in a vehicle includes a radar system. The radar system includes a uniform linear array (ULA) of antenna elements to receive reflected signals resulting from emitted radio frequency energy, and a uniform rectangular array (URA) of antenna elements to receive the reflected signals resulting from the emitted radio frequency energy, wherein the ULA of antenna elements are arranged perpendicular to the URA of antenna elements. The system also includes processing circuitry to estimate one or more elevation angles using the reflected signals received by the ULA of antenna elements, to estimate an azimuth angle corresponding to each of the one or more elevation angles using the one or more elevation angles and the reflected signals received by the URA of antenna elements. Each of the one or more elevation angles and the corresponding one of the azimuth angles is referred to as an angle of arrival (AOA) of the reflected signals from an object. The processing circuitry also controls an operation of the vehicle based on each AOA of each object.

In addition to one or more of the features described herein, in an [x, y, z] coordinate system, the antenna elements of the ULA are positioned at the same (x, y) coordinates and at different z coordinates.

In addition to one or more of the features described herein, the antenna elements of the URA are positioned in rows and column at different (x, y) coordinates and at a same z coordinate.

In addition to one or more of the features described herein, the antenna elements of the ULA are positioned at [0, 0, $z_i$], the antenna elements of the URA are positioned at [$x_j$, $y_k$, 0], the index i has values of 1 to M, where M is a number of the antenna elements of the ULA, the index j has values of 1 to $M_l$, and the index k has values from 0 to $M_r$, where a number of the antenna elements of the URA is a product of $M_l$ and $M_r$.

In addition to one or more of the features described herein, the processing circuitry estimates the one or more elevation angles using the reflected signals received by the ULA of antenna elements by computing each of the one or more elevation angles.

In addition to one or more of the features described herein, the processing circuitry computes each of the one or more elevation angles based on computing a received signal model.

In addition to one or more of the features described herein, the received signal model includes samples of the reflected signals received by the antenna elements of the ULA and a complex normal noise vector.

In addition to one or more of the features described herein, the processing circuitry estimates the azimuth angle corresponding to each of the one or more elevation angles by computing the azimuth angle corresponding to each of the one or more elevation angles.

In addition to one or more of the features described herein, the processing circuitry computes the azimuth angle corresponding to each of the one or more elevation angles based on computing a received signal model.

In addition to one or more of the features described herein, the received signal model includes samples of the reflected signals received by the antenna elements of the URA and a complex normal noise vector.

In another exemplary embodiment, a method of assembling a system in a vehicle includes assembling a radar system. Assembling the radar system includes forming a uniform linear array (ULA) of antenna elements to receive reflected signals resulting from emitted radio frequency energy and forming a uniform rectangular array (URA) of antenna elements to receive the reflected signals resulting from the emitted radio frequency energy. The forming the ULA of antenna elements and the URA of antenna elements includes arranging the ULA of antenna elements perpendicular to the URA of antenna elements. The method also includes configuring processing circuitry to estimate one or more elevation angles using the reflected signals received by the ULA of antenna elements, to estimate an azimuth angle corresponding to each of the one or more elevation angles using the one or more elevation angles and the reflected signals received by the URA of antenna elements. Each of the one or more elevation angles and the corresponding one of the azimuth angles is referred to as an angle of arrival (AOA) of the reflected signals from an object. The processing circuitry is also configured to control an operation of the vehicle based on each AOA of each object.

In addition to one or more of the features described herein, the forming the ULA of antenna elements includes positioning the antenna elements of the ULA, in an [x, y, z] coordinate system, at the same (x, y) coordinates and at different z coordinates.

In addition to one or more of the features described herein, the forming the URA of antenna elements includes positioning the antenna elements of the URA in rows and column at different (x, y) coordinates and at a same z coordinate.

In addition to one or more of the features described herein, the positioning the antenna elements of the ULA is at [0, 0, $z_i$], the positioning of the antenna elements of the URA is at [$x_j$, $y_k$, 0], the index i has values of 1 to M, where M is a number of the antenna elements of the ULA, the index j has values of 1 to $M_l$, and the index k has values from 0 to $M_r$, where a number of the antenna elements of the URA is a product of $M_l$ and $M_r$.

In addition to one or more of the features described herein, the configuring the processing circuitry includes the processing circuitry estimating the one or more elevation angles using the reflected signals received by the ULA of antenna elements by computing each of the one or more elevation angles.

In addition to one or more of the features described herein, the configuring the processing circuitry includes the processing circuitry computing each of the one or more elevation angles based on computing a received signal model.

In addition to one or more of the features described herein, the computing the received signal model includes the received signal model including samples of the reflected signals received by the antenna elements of the ULA and a complex normal noise vector.

In addition to one or more of the features described herein, the configuring the processing circuitry includes the processing circuitry estimating the azimuth angle corresponding to each of the one or more elevation angles by computing the azimuth angle corresponding to each of the one or more elevation angles.

In addition to one or more of the features described herein, the configuring the processing circuitry includes the processing circuitry computing the azimuth angle corresponding to each of the one or more elevation angles based on computing a received signal model.

In addition to one or more of the features described herein, the computing the received signal model includes the received signal model including samples of the reflected signals received by the antenna elements of the URA and a complex normal noise vector.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is a process flow of a method of performing multi-stage AOA estimation according to one or more embodiments.

DETAILED DESCRIPTION

Figure 1:
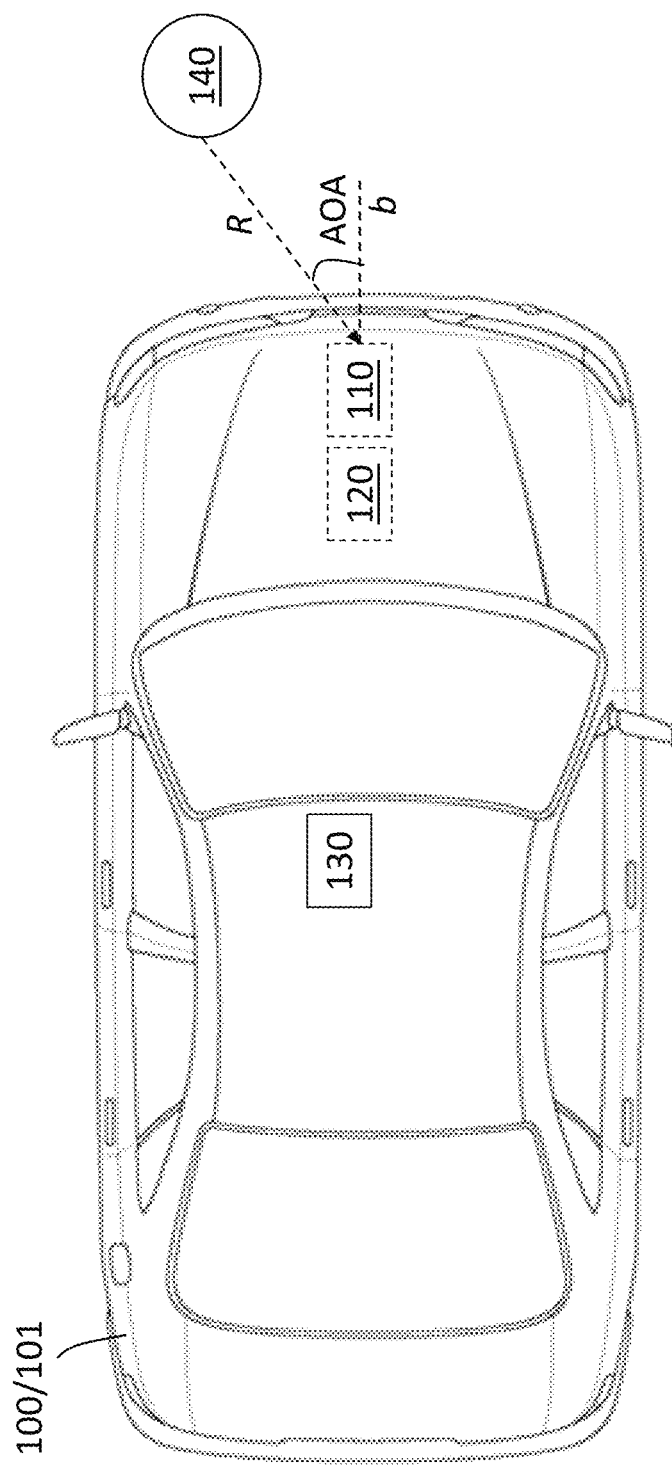
FIG. 1 is a vehicle with a radar system that performs a multi-stage angle-of-arrival (AOA) estimate according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a radar system may be among the sensors used to obtain information about the environment around a vehicle. The angle-of-arrival (AOA) provided by a radar system is the angle from which a reflected signal arrives at an antenna, relative to the antenna boresight. Thus, the AOA indicates the angle to the reflecting object from the radar system. When reflected signals are highly correlated (i.e., largely similar), distinguishing the azimuth and elevation AOA components may be challenging. Prior approaches involve estimating azimuth and elevation angles separately and then pairing elevation and corresponding azimuth angle estimates related to the same reflection. Embodiments of the systems and methods herein relate to a multi-stage AOA estimate in a vehicle radar system. A uniform linear array (ULA) of antenna elements is used to estimate elevation angles. A perpendicular uniform rectangular array (URA) of antenna elements is used to estimate azimuth angles in a subsequent stage based on the elevation angle estimates.

In accordance with an exemplary embodiment, FIG. 1 is a vehicle 100 with a radar system 110 that performs a multi-stage AOA estimate. The exemplary vehicle 100 shown in FIG. 1 is an automobile 101. In addition to the radar system 110, the vehicle 100 may include additional sensors 130 (e.g., cameras, lidar system). The numbers and locations of radar systems 110 and additional sensors 130 are not limited by the exemplary illustration. The vehicle 100 also includes a controller 120. The controller 120 may obtain information from the radar system 110 and one or more additional sensors 130 and use the information to control an operation of the vehicle 100, for example. An exemplary object 140 (e.g., another vehicle 100, a pedestrian, a tree) is indicated, and a reflected signal R resulting from reflection of emitted energy by the object 140 is also indicated. The AOA relative to an antenna boresight b is shown. In the two-dimensional view in FIG. 1, the AOA indicates the azimuth angle (in the xy plane) while the elevation angle (between the xy plane and the z axis) is not visible.

The radar system 110 may include its own controller and the processes involved in estimating AOA may be performed by the controller of the radar system 110, by the controller 120, or a combination thereof. The controller of the radar system 110 and the controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
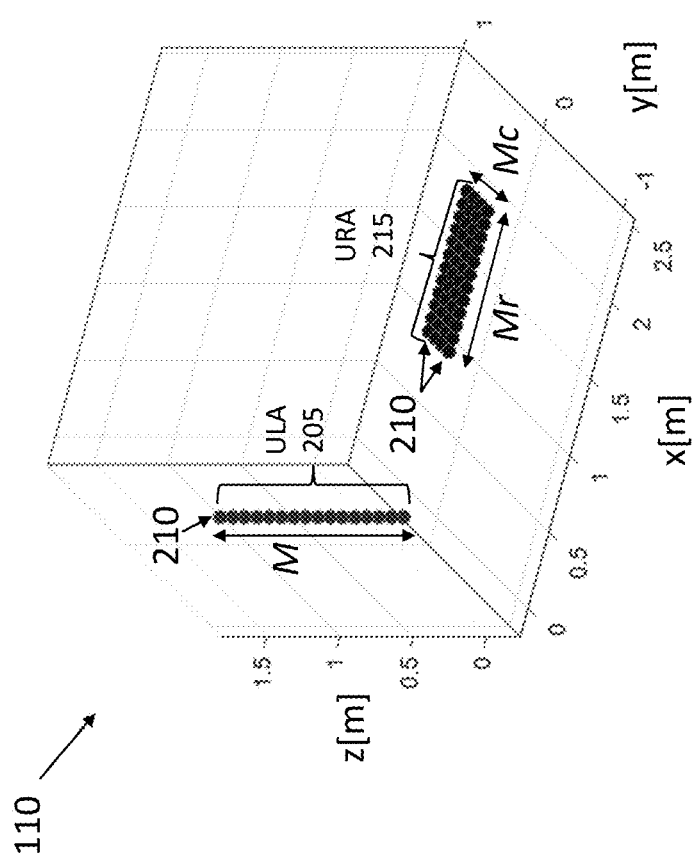
FIG. 2 details aspects of the radar system used to perform multi-stage AOA estimation according to one or more embodiments.

FIG. 2 details aspects of the radar system 110 used to perform multi-stage AOA estimation according to one or more embodiments. Specifically, the antenna configuration is illustrated with positions indicated on an x, y, z coordinate system in meters (m). A uniform linear array (ULA) 205 of antenna elements 210 and a uniform rectangular array (URA) 215 of antenna elements 210 is shown. There are M antenna elements 210 in the ULA 205. In the exemplary case shown in FIG. 2, M=16. In the URA 215, the number of rows Mr of antenna elements 210 is 12 and the number of column Mc of antenna elements 210 is 4 in the illustrated example. Thus, in the exemplary case, the total number of antenna elements 210 in the URA 215 is 48 (Mr×Mc). As shown, the ULA 205 is perpendicular to the URA 215. This relative positioning of the ULA 205 and URA 215 is necessary to eliminate the azimuth component from the angle estimate obtained with the ULA 205, as detailed with reference to FIG. 3. All of the antenna elements 210 receive reflected energy resulting from transmission of radio frequency emissions from the radar system 110.

FIG. 3 is a process flow of a method 300 of performing multi-stage AOA estimation according to one or more embodiments. The processes may be performed by processing circuitry within the radar system 110, by the controller 120, or a combination of the two. At block 310, the processes include obtaining reflected signals at each antenna element 210 of the ULA 205 and the URA 215. At block 320, the processes include estimating elevation angles based on reflected signals R that are received at each antenna element 210 of the ULA 205 as detailed. At block 330, the processes include estimating an azimuth angle corresponding to each elevation angle estimate obtained with the ULA 205 (at block 320) based on reflected signals R that are received at each antenna element 210 of the URA 215, as also detailed. Once the azimuth and elevation angle estimates (i.e., AOA estimates) are obtained (at blocks 320 and 330), those and other information (e.g., range, range rate) from the radar system 110 may be used, at block 340, to perform autonomous or semi-autonomous control of the vehicle 100 or to provide an alert to the driver regarding one or more objects 140.

The received reflected signals R at each antenna element 210 form a vector of signal replicas:

$$s(t_k) \triangleq [s_1(t_k), s_2(t_k), \ldots, s_L(t_k)]^T \qquad [EQ. 1]$$

The T in EQ. 1 indicates a transpose. The number of received reflected signals R at each antenna element 210 is L and the index k=1, 2, ..., Ns, the number of time samples. The L received reflected signals R may be highly correlated, as previously noted. As such, conventional AOA estimation may not be feasible. The received signal model is given by:

$$y(t_k) = \overline{A}(\phi, \theta) s(t_k) + n(t_k) \qquad [EQ. 2]$$

In EQ. 2, y is a $(M+M_r \times M_l) \times 1$ complex vector representing the signal sampled at time sample $t_k$, $\phi$ is the azimuth angle, $\theta$ is the elevation angle, and $n(t_k)$ is a $(M+M_r \times M_l) \times 1$ complex vector representing additive noise at the time sample $t_k$. Statistically, assumptions that are made about the received reflected signals R and the noise are:

$$s_i(t_k) \sim CN(0, C) \qquad [EQ. 3]$$

$$n(t_k) \sim CN(0, \sigma_\omega I) \qquad [EQ. 4]$$

In EQS. 3 and 4, CN indicates a complex normal random vector with a mean of 0. The covariance matrix C in EQ. 3 is an L×L non-diagonal complex matrix, and in EQ. 4, the covariance matrix is a product of the noise power a and the identity matrix I.

Also from EQ. 2:

$$\overline{A}(t_k) \triangleq [\overline{a}(\phi_1, \theta_1), \overline{a}(\phi_2, \theta_2), \ldots, \overline{a}(\phi_L, \theta_L)] \qquad [EQ. 5]$$

The generalized array response vector a is given by:

$$\tilde{a} \triangleq Ga \qquad [EQ. 6]$$

Then, to facilitate array processing:

$$\overline{a} \triangleq \frac{\tilde{a}}{\|\tilde{a}\|} = \frac{Ga}{\left(a^H G^H G a\right)^{\frac{1}{2}}} \qquad [EQ. 7]$$

The H in EQ. 7 indicates a Hermitian operator. In EQS. 6 and 7, the array radiation patter G is given by:

$$G \triangleq \begin{bmatrix} g_1(\phi, \theta) & \ldots & 0 \\ \vdots & \ddots & \vdots \\ 0 & \ldots & g_M(\phi, \theta) \end{bmatrix} \qquad [EQ. 8]$$

Each g is the complex gain associated with one of the M antenna elements 210 in the direction $(\theta, \phi)$. The gain values may be obtained via calibration of each antenna element 210 prior to deployment in the radar system 110. The value reflects antenna phase and gain in the presence of mutual coupling with other neighboring antenna elements 210 in the ULA 205 or URA 215. If each antenna element 210 had equal gain in all directions (i.e., were omnidirectional), then the radiation pattern G would be the identity matrix. In EQ. 6, the steering vector a, which is the vector of signal phase-shifts observed for a signal transmitted from $(\theta, \phi)$, is expressed as:

$$a(\phi, \theta) \triangleq \begin{bmatrix} e^{ju^T q_0} \\ \vdots \\ e^{ju^T q_{M-1}} \end{bmatrix} \qquad [EQ. 9]$$

In EQ. 9, each $q_m$ is a location of an antenna element 210 in the x, y, z axis shown in FIG. 2, with the index m identifying the antenna element 210 in the ULA 205 or URA 215. Each location is given by:

$$q_m \triangleq [x_m, y_m, z_m]^T \qquad [EQ. 10]$$

In the case of the antenna elements 210 that are part of the ULA 205, the x and y coordinates are 0 ($q_m \triangleq [0, 0, z_m]^T$), as shown in FIG. 2, or another constant. In the case of the antenna elements 210 of the URA 215, the z coordinate is 0 ($q_m \triangleq [x_m, y_m, 0]^T$), as shown in FIG. 2, or another constant. Also in EQ. 9, the vector u of phase shifts corresponding to each AOA of interest is given by:

$$u \triangleq \frac{2\pi}{\lambda} \begin{bmatrix} \sin\phi\cos\theta \\ \cos\phi\cos\theta \\ \sin\theta \end{bmatrix} \qquad [EQ. 11]$$

Using EQ. 9 and EQ. 11 for the ULA 205 (i.e., $q_m \triangleq [0, 0, z_m]^T$), the product $u^T q_m$ that is part of EQ. 9 would leave only the sin $\theta$ component of the vector u, according to EQ. 11. That is, only the elevation angle $\theta$ remains. As such, the ULA 205 received reflected signals R may be used to estimate elevation angles $\theta$ from which each of the reflected signals R arrived at each of the antenna elements 210 of the ULA 205. The elevation angles $\theta$ are between $$-\frac{\pi}{2} \text{ and } \frac{\pi}{2}.$$

Known algorithms may be used to obtain the elevation angle $\theta$ estimates. That is, each elevation angle $\theta$ estimate may be computed as opposed to a grid search being performed according to a prior approach. For example, a multiple signal classification (MUSIC) class of algorithms (e.g., root-MUSIC) may be used to compute elevation angles $\theta_i$, where i=1, ..., L. The root-MUSIC algorithm obtains a singular value decomposition of a covariance matrix that is obtained using snapshots, according to EQ. 2, composed of the reflected signals R received at antenna elements 210 of the ULA 205. A unitary matrix resulting from the singular value decomposition includes components for the L replicas, per EQ. 1, for each of the M antenna elements 210 of the ULA 205.

For each estimated value of elevation angle $\theta_i$, as EQ. 11 indicates, the corresponding azimuth angle $\phi$ may be estimated. As such, a subsequent pairing of separately estimated azimuth and elevation angles is not required, as it is according to prior approaches. A known algorithm may be used to obtain the azimuth angle ϕ estimates, as well. For example, an extension of the MUSIC class of algorithms is estimation of signal parameters via rational invariance techniques (ESPRIT). The ESPRIT algorithm obtains a singular value decomposition of a covariance matrix that is obtained using snapshots, according to EQ. 2, composed of the reflected signals R received at antenna elements 210 of the URA 215.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle comprising:
a radar system comprising:
a uniform linear array (ULA) of antenna elements configured to receive reflected signals resulting from emitted radio frequency energy; and
a uniform rectangular array (URA) of antenna elements configured to receive the reflected signals resulting from the emitted radio frequency energy, wherein the ULA of antenna elements are arranged perpendicular to the URA of antenna elements; and
processing circuitry configured to estimate one or more elevation angles using the reflected signals received by the ULA of antenna elements, to estimate an azimuth angle corresponding to each of the one or more elevation angles using the one or more elevation angles and the reflected signals received by the URA of antenna elements, wherein each of the one or more elevation angles and a corresponding one of the azimuth angles is referred to as an angle of arrival (AOA) of the reflected signals from an object, and to control an operation of the vehicle based on each AOA of each object.

2. The system according to claim 1, wherein, in an [x, y, z] coordinate system, the antenna elements of the ULA are positioned at the same (x, y) coordinates and at different z coordinates.

3. The system according to claim 2, wherein the antenna elements of the URA are positioned in rows and column at different (x, y) coordinates and at a same z coordinate.

4. The system according to claim 3, wherein the antenna elements of the ULA are positioned at $[0, 0, z_i]$, the antenna elements of the URA are positioned at $[x_j, y_k, 0]$, index i has values of 1 to M, where M is a number of the antenna elements of the ULA, index j has values of 1 to $M_l$, and index k has values from 0 to $M_r$, where a number of the antenna elements of the URA is a product of $M_l$ and $M_r$.

5. The system according to claim 1, wherein the processing circuitry is configured to estimate the one or more elevation angles using the reflected signals received by the ULA of antenna elements by computing each of the one or more elevation angles.

6. The system according to claim 5, wherein the processing circuitry is configured to compute each of the one or more elevation angles based on computing a received signal model.

7. The system according to claim 6, wherein the received signal model includes samples of the reflected signals received by the antenna elements of the ULA and a complex normal noise vector.

8. The system according to claim 1, wherein the processing circuitry is configured to estimate the azimuth angle corresponding to each of the one or more elevation angles by computing the azimuth angle corresponding to each of the one or more elevation angles.

9. The system according to claim 8, wherein the processing circuitry is configured to compute the azimuth angle corresponding to each of the one or more elevation angles based on computing a received signal model.

10. The system according to claim 9, wherein the received signal model includes samples of the reflected signals received by the antenna elements of the URA and a complex normal noise vector.

11. A method of assembling a system in a vehicle, the method comprising:
assembling a radar system comprising:
forming a uniform linear array (ULA) of antenna elements configured to receive reflected signals resulting from emitted radio frequency energy; and
forming a uniform rectangular array (URA) of antenna elements configured to receive the reflected signals resulting from the emitted radio frequency energy, wherein the forming the ULA of antenna elements and the URA of antenna elements includes arranging the ULA of antenna elements perpendicular to the URA of antenna elements; and
configuring processing circuitry to estimate one or more elevation angles using the reflected signals received by the ULA of antenna elements, to estimate an azimuth angle corresponding to each of the one or more elevation angles using the one or more elevation angles and the reflected signals received by the URA of antenna elements, wherein each of the one or more elevation angles and a corresponding one of the azimuth angles is referred to as an angle of arrival (AOA) of the reflected signals from an object, and to control an operation of the vehicle based on each AOA of each object.

12. The method according to claim 11, wherein the forming the ULA of antenna elements includes positioning the antenna elements of the ULA, in an [x, y, z] coordinate system, at the same (x, y) coordinates and at different z coordinates.

13. The method according to claim 12, wherein the forming the URA of antenna elements includes positioning the antenna elements of the URA in rows and column at different (x, y) coordinates and at a same z coordinate.

14. The method according to claim 13, wherein the positioning the antenna elements of the ULA is at $[0, 0, z_i]$, the positioning of the antenna elements of the URA is at $[x_j, y_k, 0]$, index i has values of 1 to M, where M is a number of the antenna elements of the ULA, index j has values of 1 to $M_l$, and index k has values from 0 to $M_r$, where a number of the antenna elements of the URA is a product of Mi and $M_r$.

15. The method according to claim 11, wherein the configuring the processing circuitry includes the processing circuitry estimating the one or more elevation angles using the reflected signals received by the ULA of antenna elements by computing each of the one or more elevation angles.

16. The method according to claim 15, wherein the configuring the processing circuitry includes the processing circuitry computing each of the one or more elevation angles based on computing a received signal model.

17. The method according to claim 16, wherein the computing the received signal model includes the received signal model including samples of the reflected signals received by the antenna elements of the ULA and a complex normal noise vector.

18. The method according to claim 11, wherein the configuring the processing circuitry includes the processing circuitry estimating the azimuth angle corresponding to each of the one or more elevation angles by computing the azimuth angle corresponding to each of the one or more elevation angles.

19. The method according to claim 18, wherein the configuring the processing circuitry includes the processing circuitry computing the azimuth angle corresponding to each of the one or more elevation angles based on computing a received signal model.

20. The method according to claim 19, wherein the computing the received signal model includes the received signal model including samples of the reflected signals received by the antenna elements of the URA and a complex normal noise vector.

21. The system according to claim 1, wherein perpendicular arrangement of the ULA of antenna elements to the URA of antenna elements eliminates an azimuth component from an angle estimate obtained with the ULA of antenna elements.

22. The system according to claim 1, wherein each of ULA of antenna elements and the URA of antenna elements are receivers.

* * * * *